(12) United States Patent
Hsiao et al.

(10) Patent No.: US 10,891,805 B2
(45) Date of Patent: Jan. 12, 2021

(54) 3D MODEL ESTABLISHING DEVICE AND CALIBRATION METHOD APPLYING TO THE SAME

(71) Applicant: INDUSTRIAL TECHNOLOGY RESEARCH INSTITUTE, Hsinchu (TW)

(72) Inventors: Chun-Tse Hsiao, Taipei (TW); Chuan-Chi Wang, Hsinchu (TW); Chia-Chen Chen, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 16/394,650

(22) Filed: Apr. 25, 2019

(65) Prior Publication Data

US 2019/0333286 A1   Oct. 31, 2019

Related U.S. Application Data

(60) Provisional application No. 62/662,781, filed on Apr. 26, 2018.

(30) Foreign Application Priority Data

Nov. 23, 2018  (TW) .............................. 107141879 A

(51) Int. Cl.
| G06T 19/20 | (2011.01) |
| G06T 7/80  | (2017.01) |
| G06T 19/00 | (2011.01) |

(52) U.S. Cl.
CPC ................ *G06T 19/20* (2013.01); *G06T 7/80* (2017.01); *G06T 19/006* (2013.01);
(Continued)

(58) Field of Classification Search
CPC ......... G06T 19/20; G06T 7/80; G06T 19/006; G06T 2219/2016; G06T 2200/08;
(Continued)

(56) References Cited

U.S. PATENT DOCUMENTS

| 8,013,983 B2 | 9/2011 | Lin et al. |
| 8,401,242 B2 | 3/2013 | Newcombe et al. |

(Continued)

FOREIGN PATENT DOCUMENTS

| CN | 1407504 A | 5/2004 |
| CN | 105320271 A | 2/2016 |

(Continued)

OTHER PUBLICATIONS

Dai et al., "BundleFusion: Real-time Globally Consistent 3D Reconstruction using On-the-fly Surface Re-integration", Feb. 7, 2017, Total 19 pages.

(Continued)

*Primary Examiner* — Xilin Guo
(74) *Attorney, Agent, or Firm* — Birch, Stewart, Kolasch & Birch, LLP

(57) ABSTRACT

A 3D model construction device includes a camera and a wearable display coupled to the camera. The camera obtains multiple first frames, a second frame and depth information. The wearable display includes a display unit, a processing unit, a storage unit and a projection unit. The storage unit stores a first module and a second module. When the first module is performed by the processing unit, the processing unit calculates a first pose of the wearable display. When the second module is performed by the processing unit, the processing unit calculates a 3D model according to the first frames, the depth information, the first pose and calibration parameters, and updates the 3D model according to the second frame. The projection unit projects the 3D model and (Continued)

the second frame onto the display unit according to the first pose for being displayed with a real image on the display unit.

9 Claims, 2 Drawing Sheets

(52) U.S. Cl.
CPC ...... *G06T 2200/04* (2013.01); *G06T 2200/08* (2013.01); *G06T 2207/30244* (2013.01); *G06T 2219/2016* (2013.01)

(58) Field of Classification Search
CPC ....... G06T 2207/30244; G06T 2200/04; G06T 15/20; G06T 19/00; G06T 17/00; G06T 2207/10028; G06T 19/003; G06T 17/05
See application file for complete search history.

(56) References Cited

U.S. PATENT DOCUMENTS

| | | |
|---|---|---|
| 8,711,206 B2 | 4/2014 | Newcombe et al. |
| 9,030,529 B2 | 5/2015 | Chen et al. |
| 9,083,960 B2 | 7/2015 | Wagner et al. |
| 9,230,330 B2 | 1/2016 | Luo et al. |
| 9,319,660 B2 | 4/2016 | Liou et al. |
| 2015/0193971 A1 | 7/2015 | Dryanovski et al. |
| 2016/0148433 A1* | 5/2016 | Petrovskaya .......... G02B 27/01 345/633 |
| 2016/0260251 A1 | 9/2016 | Stafford et al. |
| 2017/0011555 A1* | 1/2017 | Li ........................... G06T 1/60 |
| 2018/0144458 A1 | 5/2018 | Xu et al. |
| 2018/0192034 A1 | 7/2018 | Jin et al. |

FOREIGN PATENT DOCUMENTS

| | | |
|---|---|---|
| CN | 105404392 A | 3/2016 |
| CN | 103988226 B | 9/2017 |
| CN | 107193364 A | 9/2017 |
| TW | I321297 B | 3/2010 |
| TW | I571099 B | 2/2017 |
| TW | I574546 B | 3/2017 |
| TW | I612795 B | 1/2018 |
| TW | I622960 B | 5/2018 |

OTHER PUBLICATIONS

Taiwanese Office Action and Search Report, dated Sep. 25, 2019, for Taiwanese Application No. 107141879.

* cited by examiner

3D MODEL ESTABLISHING DEVICE AND CALIBRATION METHOD APPLYING TO THE SAME

This application claims the benefit of U.S. provisional application Ser. No. 62/662,781, filed Apr. 26, 2018 and Taiwan application Serial No. 107141879, filed Nov. 23, 2018, the disclosure of which is incorporated by reference herein in its entirety.

TECHNICAL FIELD

The disclosure relates in general to a 3D model construction device and method.

BACKGROUND 3D scenery modeling is a very popular research topic in the field of computer vision. Normally, a complete 3D scenery model is constructed using a plurality of frames and depth information. The quality of the 3D scenery model depends on whether correct poses of the frame can be estimated. However, the pose may easily be drifted due to the accumulation of errors or the feature points being insignificant. Most of existing technologies try to reduce errors using optimization algorithms, but little improvements are achieved.

SUMMARY

The disclosure is directed to a 3D model construction device and a calibration method applied to the same capable of creating a 3D model of an environmental scenery.

According to one embodiment, a 3D model construction device including a camera and a wearable display is provided. The camera is configured to obtain a plurality of first frames, a second frame and a depth information. The wearable display is coupled to the camera, and includes a display unit, a processing unit, a storage unit and a projection unit. The storage unit is coupled to the processing unit and configured to store a first module and a second module. When the first module is performed by the processing unit, the processing unit calculates a first pose of the wearable display. When the second module is performed by the processing unit, the processing unit calculates a 3D model according to the first frames, the depth information, the first pose and a plurality of calibration parameters, and updates the 3D model according to the second frame. The projection unit is coupled to the processing unit and configured to project the 3D model and the second frame onto the display unit according to the first pose for being displayed with a real image on the display unit.

According to another embodiment, a calibration method applied to a 3D model construction device is provided. The method includes the following steps: The 3D model construction device is enabled to move along a plurality of directional straight lines, and a plurality of first moving velocity vectors of a wearable display of the 3D model construction device with respect to each direction and a plurality of second moving velocity vectors of a camera of the 3D model construction device with respect to each direction are respectively obtained. A rotation parameter is calculated according to the first moving velocity vectors and the second moving velocity vectors. The 3D model construction device is arbitrarily moved, and a plurality of rotation amount information are recorded, wherein the rotation amount information respectively include the rotation amount of the wearable display at the time point whenever the angular velocity of the 3D model construction device is larger than a first threshold, the displacement of the wearable display at the time point relative to that at the previous time point, and the displacement of the camera at the time point relative to that at the previous time point; and the rotation axis unit vector at the time point is calculated according to the rotation amount at the time point. A displacement parameter is calculated according to the rotation amount information and the rotation axis unit vectors.

The above and other aspects of the disclosure will become better understood with regard to the following detailed description of the preferred but non-limiting embodiment (s). The following description is made with reference to the accompanying drawings.

DETAILED DESCRIPTION

Figure 1:
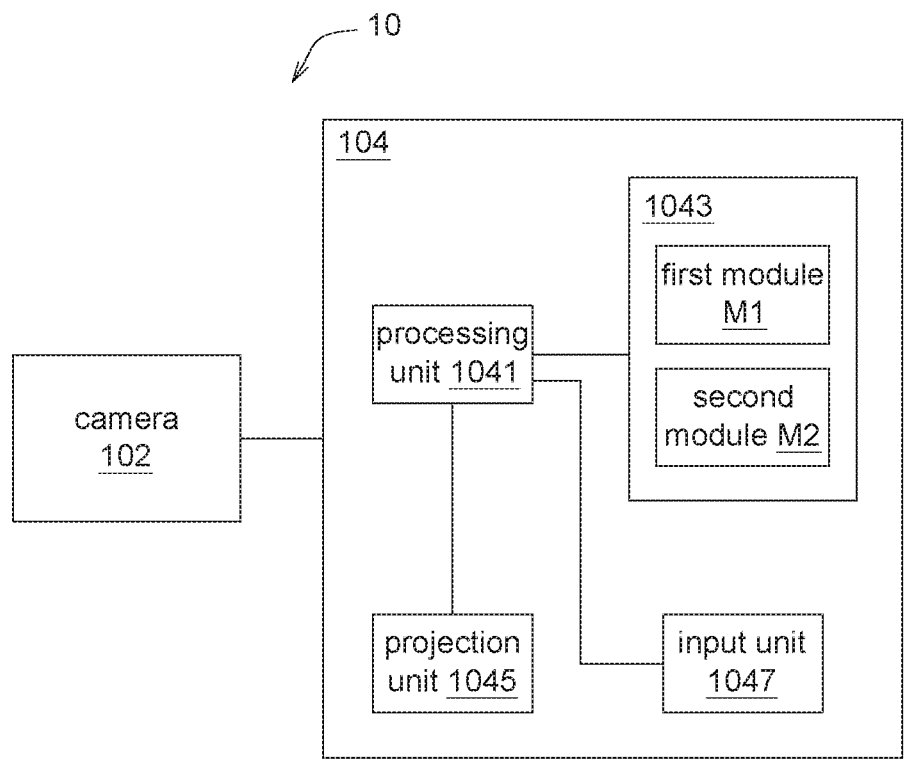
FIG. 1 is a block diagram of a 3D model construction device according to an embodiment of the present disclosure.

Referring to FIG. 1, a block diagram of a 3D model construction device according to an embodiment of the present disclosure is shown. Also, referring to FIG. 2, a schematic diagram of a 3D model construction device according to an embodiment of the present disclosure is shown. The 3D model construction device 10 includes a camera 102 and a wearable display 104. The 3D model construction device 10 is configured to construct a 3D model of an environmental scenery. In an embodiment, the 3D model construction device 10 is an augmented reality (AR) device. In other embodiment, the 3D model construction device 10 can be a virtual reality (VR) device, a substitutional reality device or a mixed reality (MR) device.

Figure 2:
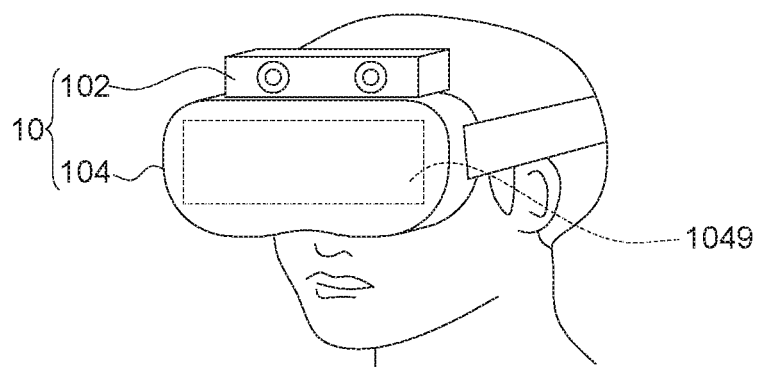
FIG. 2 is a schematic diagram of a 3D model construction device according to an embodiment of the present disclosure.

The camera 102 can be realized by an RGB-D camera. Apart from capturing the color information of the environment, the camera 102 can further uses its depth sensors to capture the depth information of the environment. The camera 102 is configured to obtain a plurality of first frames, a second frame and a depth information. The second frame is the frame obtained most recently, and the first frames are a plurality of frames obtained prior to the second frame. As indicated in FIG. 2, the camera 102 can be detachably or fixedly disposed on the wearable display 104.

The wearable display 104 is coupled to the camera 102 such that signals and data can be transmitted between the wearable display 104 and the camera 102. The wearable display 104 includes a display unit 1049, a processing unit 1041, a storage unit 1043, a projection unit 1045 and an input unit 1047. As indicated in FIG. 2, the display unit 1049 can be realized by a head mount display (HMD). The processing unit 1041 includes one or more than one dedicated integrated circuit chip or general purpose processor for constructing a 3D model. The storage unit 1043 can be realized by a non-volatile memory, such as an NAND flash memory, for storing application programs and data. The storage unit 1043 includes a first module M1 and a second module M2. The first module M1 and the second module M2 are computer readable programs composed of a plurality of computer readable instructions. When the first module M1 is performed by the processing unit 1041, the processing unit 1041 calculates a first pose of the wearable display 104. The processing unit 1041 calculates the first pose according to one or more than one sensor (not illustrated) of the wearable display 104. The calculation method can adopt the method most commonly used in the technology field, so the details are not disclosed here. When the second module M2 is performed by the processing unit 1041, the processing unit 1041 calculates a 3D model according to a plurality of first frames, the depth information, the first pose and a plurality of calibration parameters, and updates the 3D model according to the second frame. Detailed descriptions of the calibration parameters will be disclosed below. In short, the first module M1 is configured to calculate the current pose of the wearable display 104, and the second module M2 is configured to construct a 3D model of an environmental scenery.

The projection unit 1045 is coupled to the processing unit 1041 and configured to project the 3D model constructed by the processing unit 1041 and the second frame onto the display unit 1049. In the application of mixed reality, the user can see a real image, that is, a real environmental scenery, through the display unit 1049. The 3D model and the second frame are displayed onto the display unit 1049 for being displayed with the real image on the display unit 1049.

The camera 102 and the wearable display 104 have their respective coordinate systems. Therefore, when the wearable display 104 uses the first frames, the second frame and the depth information received from the camera 102, the coordinate system must firstly be transformed (also referred as calibration) to avoid the 3D model being greatly deviated from the actual scenery. The said calibration parameters are the basis for transforming the coordinate system.

The input unit 1047 is coupled to the processing unit 1041. The input unit 1047 (such as an input controller) can be coupled to the display unit 1049 and configured to receive an input instruction from the user and further transmit the input instruction to the processing unit 1041. The processing unit 1041 can adjust the second frame and/or the 3D model in response to the user's input instruction. Detailed descriptions are disclosed below.

Figure 3:
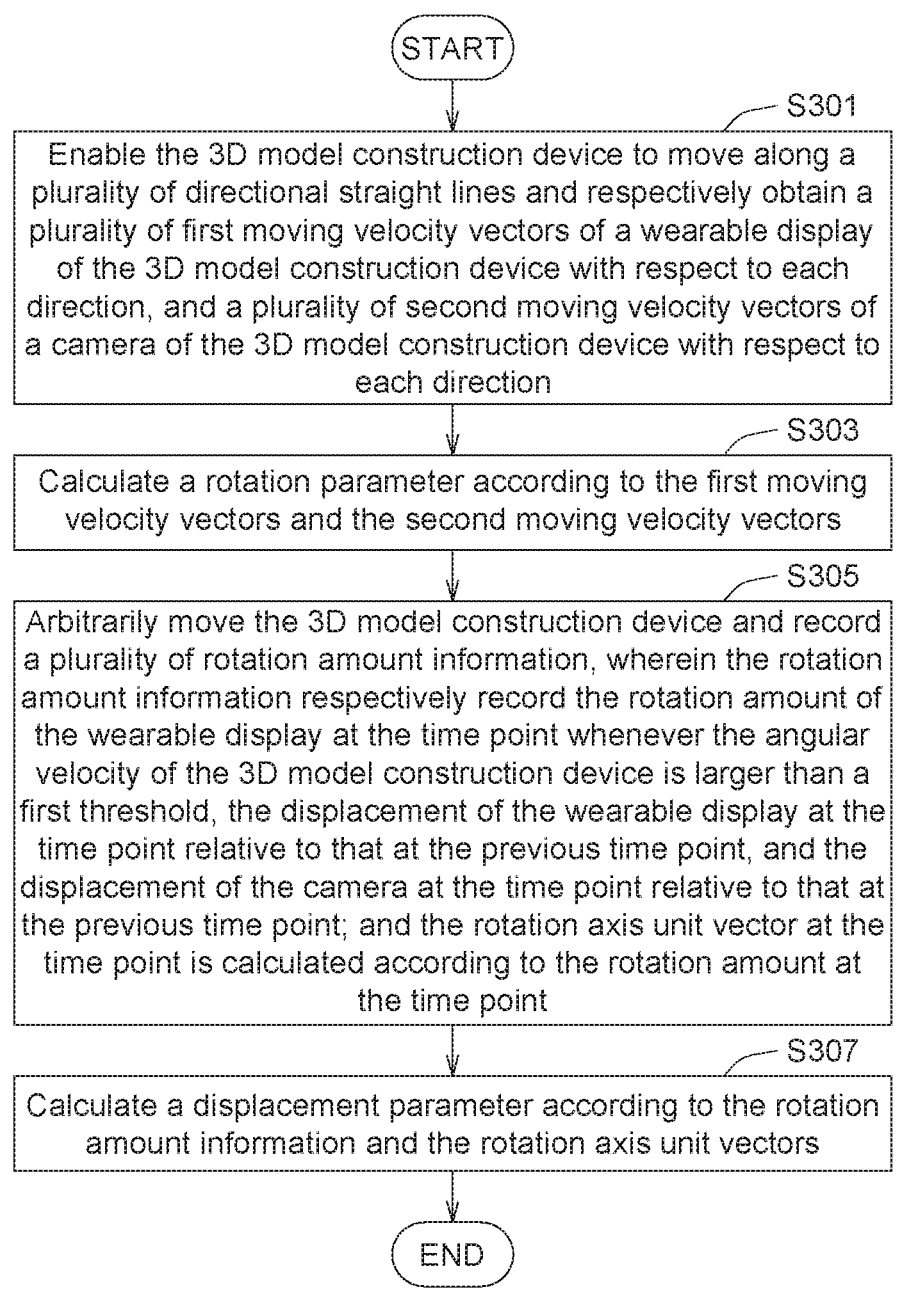
FIG. 3 is a flowchart of a calibration parameter generation method according to an embodiment of the present disclosure.

Referring to FIG. 3, a flowchart of a calibration parameter generation method according to an embodiment of the present disclosure is shown. The calibration parameters include a rotation parameter R and a displacement parameter T, wherein R and T both can be represented in the form of a matrix.

In step S301, the 3D model construction device 10 is enabled to move along a plurality of directional straight lines, and a plurality of first moving velocity vectors of the wearable display 104 with respect to each direction and a plurality of second moving velocity vectors of the camera 102 with respect to each direction are respectively obtained. For example, a tri-axis platform (the three axes, namely, the X-axis, the Y-axis and the Z-axis, are orthogonal to each other) can be provided, and the 3D model construction device 10 is fixed on a bearer unit of the tri-axis platform. Firstly, the bearer unit is operated to move the 3D model construction device 10 along the X-axis direction to obtain a first moving velocity vector $v_1$ of the wearable display 104 with respect to the X-axis direction and a second moving velocity vector $c_1$ of the camera 102 with respect to the X-axis direction, and $v_1 = Rc_1$, wherein R is a rotation parameter. Then, the bearer unit is operated to move the 3D model construction device 10 along the Y-axis direction to obtain a first moving velocity vector $v_2$ of the wearable display 104 with respect to the Y-axis direction and a second moving velocity vector $c_2$ of the camera 102 with respect to the Y-axis direction, and $v_2 = Rc_2$. Then, the bearer unit is operated to move the 3D model construction device 10 along the Z-axis direction to obtain a first moving velocity vector $v_3$ of the wearable display 104 with respect to the Z-axis direction and a second moving velocity vector $c_3$ of the camera 102 with respect to the Z-axis direction, and $v_3 = Rc_3$.

During the process of obtaining the first moving velocity vectors, the sensor of the wearable display 104 can be used for measurement. On the other hand, during the process of obtaining the second moving velocity vectors, the sensor of the camera 102 can be used for measurement. The first moving velocity vectors and the second moving velocity vectors can be provided for the processing unit 1041 of the wearable display 104 or an external computer (not illustrated) to perform subsequent calculations. Here, the "external computer" refers to a computer not included in the 3D model construction device 10 but coupled to the 3D model construction device 10 from the external.

In step S303, a rotation parameter is calculated according to the first moving velocity vectors and the second moving velocity vectors. In the above example, $R = [v_1 \ v_2 \ v_3][c_1 \ c_2 \ c_3]^{-1}$.

It should be noted that the number of moving directions is not limited to 3, and can be expanded to N (N>3) to increase accuracy. Given that the number of moving directions is N, the relationship between the first moving velocity vectors and the second moving velocity vectors can be represented by the following equation:

$$\begin{bmatrix} c_1^T & 0 & 0 \\ 0 & c_1^T & 0 \\ 0 & 0 & c_1^T \\ c_2^T & 0 & 0 \\ 0 & c_2^T & 0 \\ 0 & 0 & c_2^T \\ \vdots & \vdots & \vdots \\ c_N^T & 0 & 0 \\ 0 & c_N^T & 0 \\ 0 & 0 & c_N^T \end{bmatrix} \begin{bmatrix} r_1 \\ r_2 \\ r_3 \end{bmatrix} = \begin{bmatrix} v_1 \\ v_2 \\ v_3 \\ \vdots \\ v_N \end{bmatrix}$$

The rotation parameter R can be obtained using a least square method, and can be expressed as:

$$R = \begin{bmatrix} r_1^T \\ r_2^T \\ r_3^T \end{bmatrix}$$

After the calculation of the rotation parameter R is completed, the displacement parameter T is calculated.

In step S305, the 3D model construction device 10 is arbitrarily moved, and a plurality of rotation amount information are recorded, wherein the rotation amount information respectively record the rotation amount $R_t$ of the wearable display 104 at the time point t whenever the angular velocity is larger than a first threshold, the displacement $T_{vt}$ of the wearable display 104 at the time point t relative to that at the previous time point, and the displacement $T_{ct}$ of the camera 102 at the time point t relative to that at the previous time point; and the rotation axis unit vector $\omega_t$ at the time point t is calculated according to the rotation amount $R_t$ at the time point t.

In step S307, the displacement parameter T is calculated according to the rotation amount information and the rotation axis unit vector. Suppose n rotation amount information are collected, wherein n is an integer ≥2. When n is an odd number, the relationship among the rotation amount information, the rotation axis unit vector and the displacement parameter can be represented by the following equation:

$$\begin{bmatrix} ([\omega_2]_X^2 - [\omega_1]_X^2) \\ ([\omega_4]_X^2 - [\omega_3]_X^2) \\ \vdots \\ ([\omega_n]_X^2 - [\omega_{n-1}]_X^2) \\ [-\omega_{n+1}]_X^2 \end{bmatrix} T = \begin{bmatrix} (R_1 - I)^{-1}\Delta T_1 - (R_2 - I)^{-1}\Delta T_2 \\ (R_3 - I)^{-1}\Delta T_3 - (R_4 - I)^{-1}\Delta T_4 \\ \vdots \\ (R_{n-1} - I)^{-1}\Delta T_{n-1} - (R_n - I)^{-1}\Delta T_n \\ (R_{n+1} - I)^{-1}\Delta T_{n+1} \end{bmatrix}$$

When n is an even number, the relationship among the rotation amount information, the rotation axis unit vector and the displacement parameter can be represented by the following equation:

$$\begin{bmatrix} ([\omega_2]_X^2 - [\omega_1]_X^2) \\ ([\omega_4]_X^2 - [\omega_3]_X^2) \\ \vdots \\ ([\omega_n]_X^2 - [\omega_{n-1}]_X^2) \end{bmatrix} T = \begin{bmatrix} (R_1 - I)^{-1}\Delta T_1 - (R_2 - I)^{-1}\Delta T_2 \\ (R_3 - I)^{-1}\Delta T_3 - (R_4 - I)^{-1}\Delta T_4 \\ \vdots \\ (R_{n-1} - I)^{-1}\Delta T_{n-1} - (R_n - I)^{-1}\Delta T_n \end{bmatrix}$$

Wherein I is a unit matrix, $\Delta T_t = T_{ct} - T_{vt}[\omega_t]_X$ is a user defined operator:

$$[\omega_t]_X = \begin{pmatrix} 0 & -\omega_{zt} & \omega_{yt} \\ \omega_{zt} & 0 & -\omega_{xt} \\ -\omega_{yt} & \omega_{xt} & 0 \end{pmatrix}$$

Wherein $\omega_{xt}$ is a component of the unit rotation axis vector $\omega_t$ on the X-axis; $\omega_{yt}$ is a component of the unit rotation axis vector $\omega_t$ on the Y-axis; and $\omega_{zt}$ is a component of the unit rotation axis vector $\omega_t$ on the Z-axis.

It should be noted that the rotation amount $R_t$ obtained in the present step is different from the rotation parameter R obtained in step S303.

The displacement parameter T can be obtained by resolving the above equation using the pseudo inverse.

In an embodiment, the processing unit 1041 can instantly update the rotation parameter R and the displacement parameter T through the management of a first buffer and a second buffer, using such as a first in first out (FIFO) method. For example, the first buffer is configured to store relevant information for calculating the rotation parameter R; and the second buffer is configured to store relevant information for calculating the displacement parameter T. When the first buffer is full (for example, the first buffer has accumulated n relevant information), the processing unit 1041 immediately calculates the rotation parameter R according to the relevant information stored in the first buffer using the calculation method disclosed above. Whenever an information is stored to the first buffer, the oldest information will be discarded, so that the processing unit 1041 can again calculate the rotation parameter R to update the rotation parameter R. Similarly, the displacement parameter T can be instantly updated using similar method.

After the calibration parameters are obtained, the calibration parameters can be recorded in the second module M2. When the second module M2 is performed by the processing unit 1041, the processing unit 1041 can represent the first frames, the second frame and the depth information provided by the camera 102 in the coordinate system of the wearable display 104 according to the calibration parameters, and further create/update the 3D model according to the first pose and the first frames, the second frame and the depth information whose coordinate system has been transformed.

In an embodiment, the user can compare the second frame projected onto the display unit 1049 with a real image to determine whether the projected second frame matches the real image (or the 3D model). If the user concludes that the second frame is deviated from the real image, then the user can send a frame adjustment instruction through the input unit 1047. The frame adjustment instruction may include the movement along the X-axis direction, the Y-axis direction and the Z-axis direction and/or the rotation around the X-axis, the Y-axis and the Z-axis. Under the circumstance that the second module M2 is performed by the processing unit 1041, the processing unit 1041, after receiving the frame adjustment instruction, concludes that the calibration parameters may need to be adjusted, and therefore generates a plurality of first correction parameter according to the frame adjustment instruction. Then, the processing unit 1041 updates calibration parameters according to the first correction parameter.

In an embodiment, the user can compare the 3D model projected onto the display unit 1049 with a real image to determine whether the 3D model constructed by the processing unit 1041 matches the real image. If the user concludes that the 3D model is deviated from the real image or concludes that the position of the 3D model needs to be adjusted, the user can send a model adjustment instruction through the input unit 1047. The model adjustment instruction may include the movement along the X-axis direction, the Y-axis direction and the Z-axis direction and/or the rotation around the X-axis, the Y-axis and the Z-axis. Under the circumstance that the second module M2 is performed by the processing unit 1041, the processing unit 1041, after receiving the model adjustment instruction, concludes that the first pose may need to be adjusted, and therefore a plurality of second correction parameters according to the model adjustment instruction. When the first module M1 is performed by the processing unit 1041, the processing unit 1041 updates the first pose according to the second correction parameter.

In an embodiment, the first correction parameter and the second correction parameter can respectively be generated according to the displacement and/or the rotation amount adjusted by the frame adjustment instruction and the model adjustment instruction.

In an embodiment, when the second module M2 is performed by the processing unit 1041, the processing unit 1041 calculates a degree of similarity according to the second frame and the 3D model, generates an adjustment prompt according to the degree of similarity, and enables the projection unit 1045 to project the adjustment prompt onto the display unit 1049. For example, the processing unit 1041 firstly finds an overlapping region A=Overlap (F,pf,M,pm) using the voxel hulls method. Then, the average of square of variation of each corresponding point at the overlapping region is calculated and used as the degree of similarity, wherein the RGB information and the depth information are respectively multiplied by a real number weight ($\omega_r$, $\omega_d$) to obtain the degree of similarity S represented by the following equation:

$$S = \omega_r \times \frac{\sum (\Delta rgb)^2}{N} + \omega_d \times \frac{\sum (\Delta depth)^2}{N}$$

Wherein $\Delta rgb$ represents the RGB variation of the RGB information; $\Delta depth$ represents the depth variation of the depth information; and N represents the number of total points at the overlapping region.

In another embodiment, the 3D model construction device is a virtual reality device. In the present embodiment, the 3D model construction device further includes a first camera configured to capture and display the environmental scenery on a display unit. The processing unit enables the projection unit to project the constructed 3D model and the second frame onto the display unit, or to display the 3D model and the second frame on the display unit using a computation function. The above calibration method for adjusting the second frame/the 3D model and calculating the degree of similarity can be applied to the present embodiment.

The 3D model construction device of the present disclosure integrates a camera and a wearable display, and generates calibration parameters using the calibration method, such that the wearable display transforms the coordinate system of the frames and the depth information provided by the camera into the coordinate system of the wearable display according to calibration parameters to construct a 3D model. Besides, through the comparison between the current frame provided by the camera and a real image, the user can instantly adjust the position and/or angle of the frame or the 3D model. The wearable display can modify its own pose and/or calibration parameters according to the user's adjustment, such that the updated 3D model can be closer to actual environmental scenery, and an interactive adjustment between the frame and the scenery model can be achieved. Moreover, the wearable display can further calculate the degree of similarity between the current frame and the 3D model and generate an adjustment prompt according to the degree of similarity for the user's reference when making adjustment.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A 3D model construction device, comprising:
a camera configured to obtain a plurality of first frames, a second frame and a depth information; and
a wearable display coupled to the camera, wherein the wearable display comprises:
a display unit;
a processing unit;
a storage unit coupled to the processing unit and configured to store a first module and a second module, wherein when the first module is performed by the processing unit, the processing unit calculates a first pose of the wearable display; when the second module is performed by the processing unit, the processing unit calculates a 3D model according to the first frames, the depth information, the first pose and a plurality of calibration parameters, and updates the 3D model according to the second frame; and
a projection unit coupled to the processing unit and configured to project the 3D model and the second frame onto the display unit according to the first pose for being displayed with a real image on the display unit,
wherein the calibration parameters are a basis for transforming between a coordinate system of the camera and a coordinate system of the wearable display,
wherein the calibration parameters comprise a rotation parameter generated according to the following steps:
enabling the 3D model construction device to move along a plurality of directional straight lines and respectively obtain a plurality of first moving velocity vectors of the wearable display with respect to each direction and a plurality of second moving velocity vectors of the camera with respect to each direction; and
calculating the rotation parameter according to the first moving velocity vectors and the second moving velocity vectors.

2. The 3D model construction device according to claim 1, wherein the wearable display further comprises an input unit coupled to the processing unit and configured to receive a frame adjustment instruction for the second frame from a user; when the second module is performed by the processing unit, the processing unit generates a plurality of first correction parameter according to the frame adjustment instruction, and changes at least one of the calibration parameters according to the first correction parameters.

3. The 3D model construction device according to claim 1, further comprising an input unit coupled to the processing unit and configured to receive a model adjustment instruction for the 3D model from a user, wherein when the second module is performed by the processing unit, the processing unit generates a plurality of second correction parameters according to the model adjustment instruction; when the first module is performed by the processing unit, the processing unit changes the first pose according to the second correction parameters.

4. The 3D model construction device according to claim 1, wherein when the second module is performed by the processing unit, the processing unit calculates a degree of similarity according to the second frame and the 3D model, and generates an adjustment prompt according to the degree of similarity.

5. The 3D model construction device according to claim 1, wherein the calibration parameters comprises a displacement parameter generated according to the following steps:
arbitrarily moving the 3D model construction device and recording a plurality of rotation amount information, wherein the rotation amount information respectively record the rotation amount of the wearable display at the time point whenever the angular velocity of the 3D model construction device is larger than a first threshold, the displacement of the wearable display at the time point relative to that at the previous time point, and the displacement of the camera at the time point relative to that at the previous time point; and the rotation axis unit vector at the time point is calculated according to the rotation amount at the time point; and
calculating the displacement parameter according to the rotation amount information and the rotation axis unit vectors.

6. A calibration method applied to the 3D model construction device, comprising:
- enabling the 3D model construction device to move along a plurality of directional straight lines and respectively obtaining a plurality of first moving velocity vectors of a wearable display of the 3D model construction device with respect to each direction, and a plurality of second moving velocity vectors of a camera of the 3D model construction device with respect to each direction;
- calculating a rotation parameter according to the first moving velocity vectors and the second moving velocity vectors;
- arbitrarily moving the 3D model construction device and recording a plurality of rotation amount information, wherein the rotation amount information respectively record the rotation amount of the wearable display at the time point whenever the angular velocity of the 3D model construction device is larger than a first threshold, the displacement of the wearable display at the time point relative to that at the previous time point, and the displacement of the camera at the time point relative to that at the previous time point; and the rotation axis unit vector at the time point is calculated according to the rotation amount at the time point; and
- calculating a displacement parameter according to the rotation amount information and the rotation axis unit vectors, wherein the rotation parameter and the displacement parameter are a basis for transforming between a coordinate system of the camera and a coordinate system of the wearable display.

7. The calibration method according to claim 6, wherein a processing unit of the wearable display calculates a 3D model according to the rotation parameter, the displacement parameter, a plurality of first frames, a depth information, a first pose, and a plurality of calibration parameters, and updates the 3D model according to the second frame; the first frames, the depth information, the first pose and the calibration parameters are provided by the camera.

8. The calibration method according to claim 7, wherein the processing unit generates a plurality of first correction parameters according to a frame adjustment instruction for a second frame obtained by the camera from a user, and changes at least one of the rotation parameter and the displacement parameter according to the first correction parameters.

9. The calibration method according to claim 7, wherein the processing unit generates a plurality of second correction parameters according to a model adjustment instruction for a 3D model established by the 3D model construction device received from a user, and changes the first pose according to the second correction parameters.

* * * * *